United States Patent
Du

(10) Patent No.: US 11,627,248 B2
(45) Date of Patent: Apr. 11, 2023

(54) SHOOTING METHOD FOR SHOOTING DEVICE, AND ELECTRONIC EQUIPMENT

(71) Applicant: Chengdu Sioeye Technology Co., Ltd., Sichuan (CN)

(72) Inventor: Zhongqiang Du, Sichuan (CN)

(73) Assignee: CHENGDU SIOEYE TECHNOLOGY CO., LTD., Sichuan (CN)

( * ) Notice: Subject to any disclaimer, the term of this patent is extended or adjusted under 35 U.S.C. 154(b) by 0 days.

(21) Appl. No.: 17/562,535

(22) Filed: Dec. 27, 2021

(65) Prior Publication Data

US 2022/0124244 A1 Apr. 21, 2022

Related U.S. Application Data

(63) Continuation-in-part of application No. 16/778,051, filed on Jan. 31, 2020, now Pat. No. 11,245,838.

(30) Foreign Application Priority Data

Feb. 3, 2019 (CN) .......................... 201910108568.8
Feb. 3, 2019 (CN) .......................... 201910108582.8
Feb. 3, 2019 (CN) .......................... 201910108583.2

(51) Int. Cl.
*H04N 5/232* (2006.01)
*G06V 40/16* (2022.01)

(52) U.S. Cl.
CPC ....... *H04N 5/23219* (2013.01); *G06V 40/166* (2022.01); *G06V 40/172* (2022.01); *H04N 5/232411* (2018.08)

(58) Field of Classification Search
None
See application file for complete search history.

(56) References Cited

U.S. PATENT DOCUMENTS

| 10,555,393 | B1* | 2/2020 | Fu | .............. F21V 33/0052 |
| 2011/0150273 | A1* | 6/2011 | Moore | .............. G06F 16/58 |
| | | | | 707/E17.014 |

(Continued)

FOREIGN PATENT DOCUMENTS

| CN | 101216881 A | 7/2008 |
| CN | 101360228 A | 2/2009 |

(Continued)

OTHER PUBLICATIONS

Notification of Grant dated Mar. 1, 2021 for corresponding CN Patent Application No. 201910108583.2 and English translation thereof.

(Continued)

*Primary Examiner* — James M Hannett
(74) *Attorney, Agent, or Firm* — Tarolli, Sundheim, Covell & Tummino LLP

(57) ABSTRACT

Provided is a shooting method for a shooting device, including steps of: starting the shooting device to begin shooting a video when the shooting device detects a face, and recording face feature information corresponding to the video; uploading the face feature information and the corresponding video to a server and saving the face feature information and the corresponding video according to an upload and save condition after the shooting is completed, wherein binding relation information between the face feature information and the corresponding video is generated; the server receiving retrieve information, retrieving and matching corresponding face feature information according to the retrieve information, and generating a matching result; and the server outputting, according to the matching result and the binding relation information, video information bound with the matched face feature information.

13 Claims, 3 Drawing Sheets

(56) References Cited

U.S. PATENT DOCUMENTS

2015/0341548 A1* 11/2015 Petrescu ............ H04N 5/23219
                                                        348/207.1
2017/0328997 A1* 11/2017 Silverstein ............ G01S 13/765
2017/0332050 A1* 11/2017 Yamashita ............ G06K 7/1413

FOREIGN PATENT DOCUMENTS

| | | |
|---|---|---|
| CN | 101646017 A | 2/2010 |
| CN | 104320593 A | 1/2015 |
| CN | 105049712 A | 11/2015 |
| CN | 105357475 A | 2/2016 |
| CN | 105868309 A | 8/2016 |
| CN | 105872717 A | 8/2016 |
| CN | 106791424 A | 5/2017 |
| CN | 106940597 A | 7/2017 |
| CN | 107346426 A | 11/2017 |
| CN | 107368725 A | 11/2017 |
| CN | 107370938 A | 11/2017 |
| JP | 2004304653 A | 10/2004 |

OTHER PUBLICATIONS

Notification of Grant for corresponding CN Patent Application No. 201910108568.8 and English translation thereof.
Notification of Grant for corresponding CN Patent Application No. 201910108582.8 and English translation thereof.
First Office Action of priority document of CN Patent Application No. 201910108583.2 and English translation thereof.
First Office Action of priority document of CN Patent Application No. 201910108568.8 and English translation thereof.
First Office Action of priority document of CN Patent Application No. 201910108582.8 and English translation thereof.
Second Office Action of priority document of CN Patent Application No. 201910108568.8 and English translation thereof.
Second Office Action of priority document of CN Patent Application No. 201910108582.8 and English translation thereof.
First search of priority document of CN Patent Application No. 201910108568.8.
First search of priority document of CN Patent Application No. 201910108582.8.
First search of priority document of CN Patent Application No. 201910108583.2.
Non Final OA of the family U.S. Appl. No. 16/778,051.
Supplementary search of priority document CN Patent Application No. 201910108568.8.
Supplementary search of priority document CN Patent Application No. 201910108582.8.
Supplementary search of priority document CN Patent Application No. 201910108583.2.
The Second Supplementary search of priority document CN Patent Application No. 201910108582.8.

* cited by examiner

SHOOTING METHOD FOR SHOOTING DEVICE, AND ELECTRONIC EQUIPMENT

CROSS REFERENCE TO RELATED APPLICATIONS

The present application is continuation-in-part application of the U.S. patent application filed on Jan. 31, 2020 with the USPTO with the filing Ser. No. 16/778,051 and entitled "Shooting Method for Shooting Device, and Electronic Equipment", and this U.S. patent application claims priorities of Chinese Patent Application No. 201910108583.2, filed with the Chinese Patent Office on Feb. 3, 2019 and entitled "Shooting Method, Device, Equipment and Medium", Chinese Patent Application No. 201910108568.8, filed with the Chinese Patent Office on Feb. 3, 2019 and entitled "Method, Device, Equipment and Medium for Shooting and Playing Video", and Chinese Patent Application No. 201910108582.8, filed with the Chinese Patent Office on Feb. 3, 2019 and entitled "Method, Device, Equipment and Medium for Shooting and Playing", the contents of which are incorporated herein by reference in their entireties.

TECHNICAL FIELD

The present disclosure relates to the technical field of electronics, in particular to a shooting method for a shooting device and an electronic equipment.

BACKGROUND ART

In conventional methods using face recognition technologies for video shooting and analysis, generally the face recognition module and the video shooting module need to be kept in a running state for a long period of time so as to acquire face data and corresponding video data, and a lot of the acquired data is transmitted to a server to support the face searching and analysis after the shooting.

On the one hand, the long time running of the face recognition module and the video shooting module will result in relatively large energy consumption of the equipment, on the other hand, a large quantity of video data with and without faces is transmitted to the server for storage, which not only consumes the network traffic of the equipment, but also occupies a large amount of storage space of the server.

However, in certain scenarios, for example, when the shooting follows one or a limited number of individuals in motion, the conventional shooting scheme cannot meet the demands from the aspects of equipment power consumption, network traffic and storage cost, etc.

SUMMARY

Embodiments of the present disclosure provide a shooting (photographing) method for a shooting device and an electronic equipment for solving at least a part of the above mentioned technical problems.

Embodiments of the present disclosure provide a shooting method for a shooting device, including steps of:

starting the shooting device to begin shooting a video when the shooting device detects a face, and recording face feature information corresponding to the video;

uploading the face feature information and the corresponding video to a server and saving the face feature information and the corresponding video according to an upload and save condition after the shooting is completed, wherein binding relation information between the face feature information and the corresponding video is generated;

the server receiving retrieve information, retrieving and matching corresponding face feature information according to the retrieve information, and generating a matching result; and the server outputting, according to the matching result and the binding relation information, information of the video bound with the matched face feature information.

In one or more embodiments, the step of uploading the face feature information and the corresponding video to a server and saving the face feature information and the corresponding video according to an upload and save condition includes:

the server using newly received face feature information as first face feature information, and retrieving a matched face feature information in the existing face feature information in a face feature information database;

saving the first face feature information into the face feature information database if no face feature information matching the first face feature information is detected in the face feature information database, and saving the video accordingly; and if second face feature information matching the first face feature information is detected in the face feature information database, comparing the first face feature information and the second face feature information, selecting to retain the face feature information having a better quality according to a comparison result and saving the video accordingly.

In one or more embodiments, the step of uploading the face feature information and the corresponding video to a server and saving the face feature information and the corresponding video according to an upload and save condition includes:

the server using newly received face feature information as first face feature information, and searching existing face feature information in a face feature information database for a matched face feature information;

judging whether a video storage limit is triggered according to historical video data corresponding to the second face feature information after the second face feature information matching the first face feature information is detected in the face feature information database; and determining a method for processing the uploaded video according to a judgment result.

In one or more embodiments, the step of retrieving and matching corresponding face feature information according to the retrieve information, and generating a matching result further includes:

retrieving and matching the corresponding face feature information, according to the retrieve information, to generate a retrieve result of face feature information having matching degree index information of numerical values; and determining the matching result according to the matching degree index information.

In one or more embodiments, the step of server outputting, according to the matching result and the binding relation information, information of the video bound with the matched face feature information includes:

outputting, if multiple videos are stored corresponding to the face feature information contained in the matching result, description information for the multiple videos;

receiving a selection instruction from the user for selecting a target video among the multiple videos based on the description information; and outputting the target video to play according to the selection instruction.

In one or more embodiments, the step of uploading the face feature information and the corresponding video to a server and saving the face feature information and the corresponding video according to an upload and save condition after the shooting is completed includes:

judging whether the video conforms to an upload standard after the shooting device completes the shooting; and uploading the face feature information and the shot video corresponding to the face feature information to a server if the video conforms to the upload standard.

In one or more embodiments, the method further includes:

starting the shooting device to begin shooting a video when the shooting device detects a face, and recording face feature information corresponding to the video;

detecting faces continuously during the video shooting; and updating and recording, if new face feature information conforming to an update requirement is detected, the face feature information corresponding to the video according to the new face feature information.

In one or more embodiments, the step of determining a method for processing the uploaded video according to a judgment result includes:

deleting the uploaded video if the video storage limit is triggered, and saving the uploaded video accordingly if the video storage limit is not triggered; or limiting a storage time length of the uploaded video to a first time length if the video storage limit is triggered, and setting the storage time length of the uploaded video to be a second time length if the video storage limit is not triggered, wherein the second time length is greater than the first time length; or analyzing and clipping the currently uploaded video or the historical video data if the video storage limit is triggered, such that a total length of saved videos is not greater than a third time length, and saving the uploaded video accordingly if the video storage limit is not triggered.

In one or more embodiments, the step of determining the matching result according to the matching degree index information includes:

determining a quality index representing a quality of face feature information in the retrieve result; and determining a matching rule according to the quality index and determining the matching result according to the determined matching rule and the matching degree index information.

In one or more embodiments, the step of judging whether the video conforms to an upload standard includes:

the shooting device comparing the video with a preset standard face image, to judge whether the video conforms to the upload standard; and/or judging whether the video conforms to the upload standard according to a preset standard video parameter.

In one or more embodiments, the step of judging whether the video conforms to an upload standard includes:

the shooting device sending the face feature information to the server; and receiving feedback information sent by the server based on the face feature information, and judging whether the video conforms to the upload standard according to the feedback information.

In one or more embodiments, the shooting device detecting a face includes any one or a combination of the following conditions:

the shooting device detecting that a proportion of face image area in the image area shot by a camera reaches a preset proportion; or the shooting device detecting that the number of faces in the image area shot by the camera reaches a preset number; or the shooting device detecting that pixel size of the face image area reaches a preset pixel size; or the shooting device detecting that a position of the face image area in the image area shot by the camera meets a preset position requirement.

In one or more embodiments, the new face feature information conforming to an update requirement includes any one or a combination of the following conditions:

a proportion of the face image area in the new face feature information is higher than the proportion represented by original face feature information; or sharpness of the new face feature information is higher than sharpness represented by the original face feature information; or a shooting angle of the face image in the new face feature information is better than the angle represented by the original face feature information; or the number of faces in the new face feature information is larger than the number of faces represented by the original face feature information.

The above description is merely a brief introduction of the technical solutions of the present disclosure which is given for enabling better understanding of technical means of the present disclosure and for implementations according to the contents of the specification, and in order to make the above and other objectives, features, and advantages of the present disclosure more apparent and understandable, specific embodiments of the present disclosure are specifically given below.

DETAILED DESCRIPTION OF DRAWINGS

Through reading the detailed description of preferred embodiments below, various other advantages and benefits will become clear to those skilled in the art. The accompanying drawings are intended only to illustrate the preferred embodiments and are not construed as limitations on the present disclosure. Throughout the drawings, same reference signs denote same components. Among the drawings.

DETAILED DESCRIPTION OF EMBODIMENTS

Technical solutions of the present disclosure are to be described in detail below with reference to the drawings and detailed embodiments, and it should be understood that the embodiments of the present disclosure and the specific features in the embodiments are detailed descriptions of the technical solutions of the present disclosure, rather than limitations on the technical solutions of the present disclosure, and the embodiments of the present disclosure and the technical features in the embodiments can be combined with one another without conflict.

Figure 1:
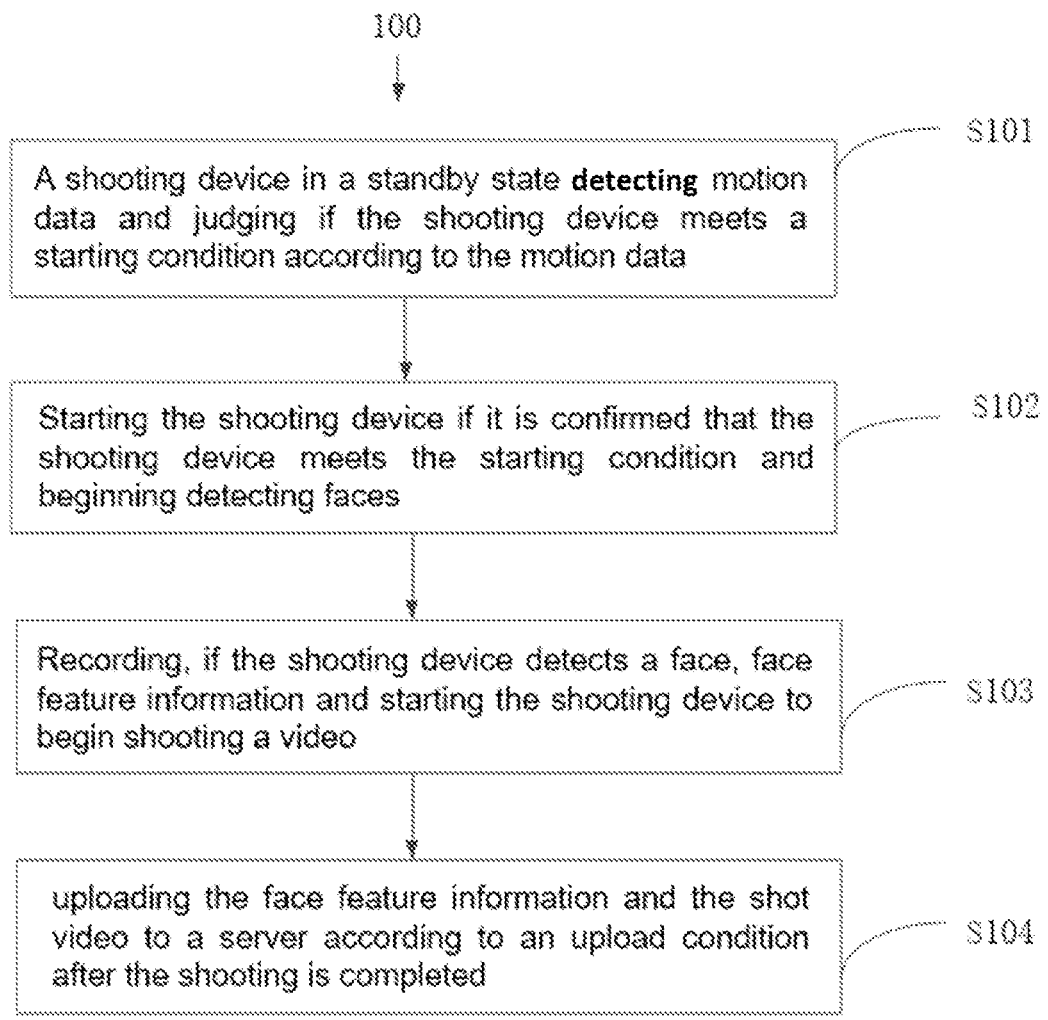
FIG. 1 is a flowchart of a shooting method according to embodiments of the present disclosure.

FIG. 1 shows a shooting method 100 according to embodiments of the present disclosure, and as shown in FIG. 1, the method includes:

Step S101, a shooting device in a standby state detecting motion data and judging if the shooting device meets a starting condition according to the motion data;

Step S102, starting the shooting device if it is confirmed that the shooting device meets the starting condition and beginning to detect faces;

Step S103, recording, if the shooting device detects a face, face feature information and starting the shooting device to begin to shoot a video; and Step S104, uploading the face feature information and the shot video to a server according to an upload condition after the shooting is completed.

In certain scenarios, if there is no significant change in the image within an acquisition range of the shooting device, the face detection and image shooting are not required to be performed continuously, thereby reducing the power consumption; and if a significant change in the image within the acquisition range of the shooting device is about to be produced or has already taken place, further face detection and image shooting are required. Therefore, in the present embodiment, the motion data may be used as a basis for determining whether the image acquired by the shooting device has changed, wherein when the motion data meets the starting condition and it is considered that a significant change has taken place in the image within the acquisition range of the shooting device, the shooting device further activates functions of face detecting and image shooting.

The shooting device of the present embodiment can be mounted on various amusement park equipment such as roller coasters, carousels, drop towers, and topple towers, the shooting device also can be mounted to transportation means such as race cars and bicycles. Motion sensor, video acquisition module with face recognition function and network transmission module for communication with the server are integrated in the shooting device. Optionally, the shooting device is a motion camera.

Detailed implementation steps of the shooting method according to the embodiments of the present disclosure are to be introduced below in detailed with reference to FIG. 1.

Step S101, a shooting device in a standby state receiving motion data and judging if the shooting device meets a starting condition;

Specifically, when the shooting device is in the standby state, a face detection function and shooting function of the shooting device may both be turned off, thus the shooting device at this time has low power consumption. Preferably, it is feasible to set that the shooting device in the standby state merely runs the simplest data monitoring function of sensors, which function consumes much less power than the face detection function, thereby the high power consumption caused by continuously running of other functions of the shooting device can be alleviated.

In some embodiments, the starting condition of the shooting device may be set targetedly according to the environment where the shooting device is placed, and descriptions are to be made below taking the shooting device being an independent single motion camera and taking the shooting device being a plurality of motion cameras forming a network as an example, respectively.

In case of an independent single motion camera:

In a case where the application scenario is that a single motion camera is used for shooting independently (no matter the actual physical position of the motion camera is separately set or set in a certain array of motion cameras), it is feasible to set that when a motion sensor of the motion camera detects that the motion data has reached a preset positive threshold, it is considered that the starting condition is met.

Specifically, the motion sensor may include, but is not limited to: gravity sensor, accelerometer, speedometer, barometer, gyroscope, range sensor, GPS receiver, or the like. Correspondingly, the motion data may be, but is not limited to: any one or a combination of absolute or variable values of position, velocity, air pressure, angular velocity, etc. Those ordinarily skilled in the art could understand that the above list is demonstrative rather than restrictive, and types of the motion sensor and the motion data which are used in the embodiment of the present disclosure are not limited to those listed above.

For instance, when the motion camera is mounted to a topple tower, the starting condition may be set as the change in air pressure exceeding 1000 Pa/s; and when the motion camera is mounted on a roller coaster, the starting condition may be set as the change in velocity reaching 3 m/s, or the acceleration reaching 0.1 g, etc.

In certain special application scenarios, due to excessively large differences among the positions of points in the array of motion cameras, or a difference between the time-speed curves of the points in the array during operation of the equipment, or an inconsistency between the change time of the speed and acceleration of the equipment during operation and the expected starting time of the shooting, it is impossible to select the appropriate threshold of motion data of types such as velocity and acceleration to start the motion camera at a correct moment. This will further lead to a result that when the motion camera is set at a certain position, especially when the motion camera is in a camera array, the use of motion data on types of velocity and acceleration alone or in combination may prevent the motion camera from starting to shoot correctly at the desired moment. Thus in the present embodiment, air pressure values or air pressure changes from the barometer or other position-type motion data, alone or in combination with other motion data (such as motion data of velocity and acceleration types) may be selected as the motion data for detection use, which enables the motion camera to correctly set a starting threshold, improving the consistency between the starting positions of shooting and reducing the difficulty of installation and maintenance.

In case of multiple motion cameras forming a network:

In a case that the application scenario requires multiple motion cameras coordinating with each other for shooting, in order to guarantee the consistency and the coordination between the shooting time of the multiple motion cameras, it is also feasible to use the multiple motion cameras to form a network so as to realize communication, data exchange and instruction synchronization between different equipment. For example, the network may be established based on an Internet of things protocol (such as Zigbee), and evidently the network may also be established based on a LAN networking technology, which is not limited herein.

Further, in view of the fact that the motion cameras in the same network are usually installed on the same facility, if the facility begins to move, the multiple motion cameras will detect similar change signals on the sensors in the same or similar time period. Therefore, in order to avoid interference from a single motion camera which causes a mistake start-up, it is feasible to set: in the camera group forming the network, only after cameras whose number meeting a preset number detect that first motion data reaches the preset positive threshold, it is confirmed that the camera group meets the starting condition, and starting of all the motion cameras in the camera group is determined. That is to say, the motion camera that detects the first motion data reaching the preset positive threshold is used as a pre-start motion camera, and when the number of the pre-start motion cameras in the camera group meets the preset requirement, it is determined that all the motion cameras in the camera group meet the starting condition.

In some other embodiments, each pre-start motion camera may decide whether to activate a pre-start state merely according to a part of data, i.e., the first motion data. For example, in an embodiment, the pre-start motion camera is configured to activate the pre-start state based on a magnitude of change in acceleration, after the number of pre-start cameras in the camera group meets the preset requirement, each camera in the camera group further checks its own second motion data, e.g., value of air pressure change, and when the second motion data also reaches a preset positive threshold, the camera confirms that the starting condition is met.

In the embodiment of the present disclosure, the preset requirement may be a requirement on proportion, for example, the number of pre-start motion cameras in the camera group accounts for 50% or more of camera group; the preset requirement also may be a requirement on number, for example, the number of the pre-start motion cameras in the camera group reaches 5 or more, which is not limited herein.

In specific implementation, the above-described collaborative anti-interference starting of the camera group may be realized in various modes, and two among which are taken below as examples.

The first mode may be realized by providing a main motion camera.

That is, a main motion camera is provided in the camera group, the main motion camera may be provided at the time of networking and installing the motion camera array, according to need, at least one main camera is manually or automatically selected as the camera for information reporting and control instruction sending. According to a certain preset rule, and when a preset condition is met, the control right of the main motion camera can also be switched to another camera to turn it into the main camera, or in case of malfunction of the main camera, other cameras may re-elect a new camera as the main camera according to an automatic strategy.

The setting, selection, switchover of the main camera and the corresponding preset rules thereof may be realized using any known method and any equivalent implementation that can achieve a similar effect in the prior art, which are not limited in the present disclosure. For example, in an embodiment, the main camera may be selected using the "Leader Election" mechanism in the "Apache ZooKeeper" open source software project.

If each motion camera detects that its first motion data reaches the preset positive threshold, the motion camera sends motion state data to the main motion camera, prompting that the camera has entered the pre-start state. After confirming that the number of the pre-start motion cameras in the camera group meets the preset requirement based on the motion state data received from each camera, the main motion camera sends a pre-start complete command to each motion camera in the camera group. Each motion camera in the group determines whether the motion camera meets the starting condition based on the pre-start complete command.

Further, in order to avoid mistake start-up, it is also feasible to set that only after each motion camera detects that its first motion data reaches the preset positive threshold and it lasts for a time period, the motion camera sends motion state data to the main motion camera. In this way, the burr noise in the process of motion data acquisition is prevented from accidentally triggering the action of sending motion state data to the main motion camera.

The motion state data sent by each motion camera may be the values of specific motion parameters detected by the motion sensor (such as acceleration value, velocity value or magnitude of height change, or other parameters). It can also be a signal sent according to a preset code (for example, code "1", "a" or "PASS", etc.) after determining that the value of the motion parameter detected by the motion sensor has reached the preset positive threshold.

For example, after detecting that the acceleration exceeds the preset positive threshold and it lasts for a preset period of time, each motion camera sends the acceleration value and motion direction information to the main motion camera, and when the main motion camera detects that the acceleration values and the direction information sent from over a half of the motion cameras in the camera group are the same with the acceleration value and direction information currently sensed by the main motion camera or the errors therebetween is smaller than a preset value, it is determined that all the motion cameras meet the starting condition and a starting instruction is sent.

For another example, after detecting that the acceleration exceeds the preset positive threshold and it lasts for a preset period of time, each motion camera sends a binary signal "1" to the main motion camera, and after receiving the "1"s from over 30% of the motion cameras in the camera group, the main motion camera determines that all the motion cameras meet the starting condition and sends the starting instruction. Specifically, by adopting a manner of sending binary signals and other codes to the main motion camera, less data is to be transmitted, which can effectively save network resources.

The second mode can be realized by broadcasting.

That is, after any motion camera in the camera group detects that its motion parameter reaches the preset positive threshold, the motion camera, in a manner of broadcasting sends its own start judgment signal to other motion cameras in the camera group and keeps receiving the start judgment signals sent by other motion cameras. After any motion camera in the camera group confirms that the number of the pre-start motion cameras in the camera group meets the preset requirement according to the received start judgment signal, the motion camera confirms that it meets the starting condition and sends the starting command to the whole group of cameras by broadcasting, and if another motion camera receives the starting command, it also confirms that the starting condition is met.

In the above, the form of the start judgment signal may be the same as that in the foregoing solution realized by providing the main motion camera, which will not be repeatedly described herein.

For example, after detecting that the acceleration exceeds the preset positive threshold and it lasts for a preset period of time, the motion camera sends a binary signal "1" to the entire group of cameras by synchronous signal broadcasting, and after one certain motion camera receives the "1"s from over 40% of the motion cameras in the camera group, the motion camera determines that the motion camera itself meets the starting condition and sends the starting instruction to other motion cameras by broadcasting.

Evidently, in specific implementation, besides the two above-described implementation of collaborative anti-interference starting of the camera group, it is also feasible to provide a server for controlling and managing the camera group. If each motion camera detects that its motion parameter reaches the preset positive threshold, the motion camera sends start judgment signal to the server. After confirming that the number of the pre-start motion cameras in the camera group meets the preset requirement based on the number of the received start judgment signals, the server sends a starting command to each motion camera in the camera group. It will not be limited herein Correspondingly, based on the same conception, after the motion camera is started, it is also feasible to set to detect whether the motion camera meets a stopping condition using the motion sensor of the motion camera, wherein if the motion camera meets the stopping condition, the motion camera is controlled to stop shooting video.

Further, in order to avoid a mistake stop, in the camera group forming the network, only after cameras whose number meeting a preset number detect that the motion parameters reach a preset reverse threshold, it is confirmed that the camera group meets the stopping condition, then stop of all the motion cameras in the camera group is determined. That is to say, the motion camera that detects the motion parameter reaching the preset reverse threshold is used as a pre-stop motion camera, and when the number of the pre-stop motion cameras in the camera group meets the preset requirement, it is determined that all the motion cameras in the camera group meet the stopping condition, then a stopping action will be executed. Considering that the detailed manner of stop judgment is similar to the foregoing manner of start judgment, for sake of brevity of the description, it will not be repeatedly described herein.

Step S102: executing starting of the shooting device and beginning to detect faces if it is determined that the shooting device meets the starting condition.

Specifically, after the shooting device meets the starting condition, not all the functions thereof are activated, and the shooting device does not really shoot a video, it only actives the function of face detection and starts to capture and detect faces. The face detection here is merely for determining, by searching, whether a face is included in the images captured by the shooting device, for this reason, neither feature calculation and comparison with a preset face image are required to be performed, and nor is it required to analyze the detailed appearance feature of the face. Only existence of the face, number of existing faces or positions of the faces are required to be detected, for this reason, calculation amount under such starting state is relatively small, which will not excessively occupy too many calculation resources, thereby the power consumption is also relatively lower.

Step S103, determining, based on a detected situation of face within a shooting range, whether to start the shooting device to begin shooting a video, and recording feature information that can be used for face recognition.

In specific implementation process, it is feasible to set the judgment criteria that the shooting device successfully detects a face according to the scenario where the shooting device is located, several criteria are listed below with the shooting device being a motion camera taken as an example.

The first criterion is that the motion camera may begin shooting a video when detecting that a proportion of a face image area in an image area captured by a camera reaches a preset proportion. In the above, the preset proportion may be set according to the scenario or position where the motion camera is installed, for example, when the position where the camera is installed is relatively distant from a seat on the facility, the preset proportion may be set to be a smaller value; and when the position where the camera is installed is relatively close to the seat on the facility, the preset proportion may be set to be a larger value.

For example, in some scenarios, when the face image area accounts for an excessively small proportion in the entire image area captured by the camera, it is impossible to obtain a clear face image, accordingly, the face recognition cannot be performed precisely. Therefore, in the present embodiment, after being started, the motion camera begins detecting faces, and if a face is detected, a successful detection of face may be confirmed if the face region accounts for 5% or more in the image currently captured by the motion camera. The specific face detection method may be any existing face detection algorithm, which is not limited herein.

The second criterion is that in some scenarios, the motion camera may begin shooting a video when detecting that the number of faces in the image area captured by the camera reaches a preset number. In the above, the preset number may be set according to the scenario or position where the motion camera is installed.

For example, when the motion camera is installed on a two-person amusement equipment and after the face detection is started, if it is detected that the number of faces in the image currently captured by the motion camera reaches 2, then a successful detection of face is confirmed. In order to avoid interference from background faces, it is also feasible to set that a successful detection of face is confirmed when the number of faces each accounting for 6% or more of the image reaches 2.

The third criterion is that pixel size of the face image area detected by the motion camera reaches a preset pixel size. The preset pixel size may be set according to the scenario and position where the motion camera is installed.

For example, after the motion camera is started and begins detecting faces, a successful detection of face may be confirmed if it is detected that the pixel size of the face region reaches 80*80 pixels in the image currently captured by the motion camera.

The forth criterion is that the motion camera detects that a position of the face image area in the image area captured by the camera meets a preset position requirement.

For example, a position of a central area may be preset, after being started, if the motion camera detects that the face region is located in the preset image central area in the image currently captured by the motion camera, then a successful detection of face is confirmed.

In specific implementation process, the judgment criteria of the shooting device successfully detecting a face are not limited to the four criteria listed above, and may be set as needed.

In some embodiments, after existence of face is detected, it is also feasible to further speculate a subjective willingness of a person being shot, and to decide whether to begin shooting according to a speculation result.

Speculation of a subjective willingness of the person being shot may be realized by recognition of image features.

For example, taking the shooting device being a motion camera as an example, in an embodiment, after detecting a face image, the motion camera further recognizes and judges whether the facial expression represented by the face image conforms to a preset positive expression. The positive expressions that can be set may specifically be: smile, laughter and seriousness and other expressions. It is also feasible to adopt an exclusion mode and set the positive expressions to be: any other expressions other than expressions of cry, sadness, depression and anger, etc. The specific method for expression recognition may be any existing expression recognition algorithm, which is not limited herein.

For example, if the motion camera detects a face and recognizes the expression of the face as laughter by analyzing, the motion camera determines the expression as a positive expression and confirms to start the shooting. For another example, if the motion camera detects a face and recognizes the expression of the face as cry by analyzing, the motion camera determines that the expression is not a positive expression and gives up starting the shooting.

In another embodiment, the motion camera recognizes the face image and a preset gesture image representing agree to the shooting, the gesture images may be specifically set to be: "OK" gesture, "V-shaped" gesture, and raised hand gesture; and it is also feasible to adopt an exclusion mode and set the gesture images to be gestures other than waving, covering face, and wagging finger, which are not limited herein.

For example, after the motion camera is started, if a face recognition module detects a face and recognizes a gesture image of raised hand, the motion camera confirms to start shooting. For another example, if the face recognition module detects a face and recognizes a gesture image of wagging finger, the motion camera considers that the user is unwilling to the shoot and thus gives up starting the shooting.

The image content can be recognized by any common means in the prior art, such as image recognition by the conventional pattern recognition method or by deep learning based on Convolutional Neural Networks (CNN), which will not be repeatedly described herein.

In some other embodiments, speculation and judgment of a subjective willingness of the person being shot may be realized in an interactive mode, for sample, in another embodiment, a button may be provided for enabling a connection to the shooting device.

By detecting whether the button is pressed by the person being shot, the subjective willingness of the person being shot is speculated, specifically, when the person being shot is unwilling to the shooting, he/she can stop the shooting device from starting the shooting by pressing the button. The specific forms of the interactive mode are not limited herein.

Speculation and judgment of the subjective willingness of the person being shot before the shooting not only can reduce the power consumption of the shooting system, reduce the invalid working time of the shooting device, extend the service life of the system, but also can effectively lower the amount of network transmission after the completion of the shooting and improve the overall performance of the network. Those of ordinary skills in the art should understand that the judgment criteria of the subjective willingness of the person being shot are not limited to the above embodiments, any technical means, which can achieve the speculation of the subjective willingness of the person being shot and by which whether to start the shooting by the shooting device can be decided, are capable of realizing the above technical effects.

Meanwhile, those of ordinary skills in the art could understand that the above judgment criteria for determining whether to start the shooting device to begin shooting a video not only can be used alone, but also can be used in combination. For example, the first, fourth, and fifth judgment criteria above described can be combined, hereby it is set that the video shooting is started only when the proportion of the face image area in the image area captured by the camera reaches a preset proportion, the face image area is located in the central area, and the expression conforms to the preset positive expression.

Further, it is also feasible to set that if the shooting device fails to detect a face in a preset time period, the shooting device is controlled to enter the standby state and stop face detection. That is to say, if the shooting has lasted for a certain time period and fails to detect a face meeting the requirements from the images, the motion camera switches to the standby state and no longer detects faces so as to reduce the power consumption.

In some embodiments of the present disclosure, in view of the fact that the shot video can be used for user's search in the later stage, it is also feasible to set that after the shooting device detects a face, the feature information corresponding to the face is extracted for facilitating the user to find the video according to the feature information on the face.

The feature information may be an acquired face picture, or may be data representing face details (e.g., face type, brow size and shape, eye shape, lip shape, and hair type, etc.), or may be three-dimensional reconstruction data of the face acquired by a three-dimensional reconstruction device provided on the shooting device or additionally separated from the shooting device, such as the currently common structured light device, binocular stereo vision device or Time of flight (ToF) device. Detailed description is made below by taking the feature information being an acquired face picture as an example.

Further, in view of the fact that the face scene detected before video shooting does not necessarily include the optimal face feature information, in the present embodiment, it is also set that, during the video shooting, the shooting device continuously detects faces, wherein if face feature information conforming to the update requirement is detected, feature information corresponding to the video currently being shot is updated according to the face feature information, such that the feature information corresponding to the video is optimal after the video shooting is finished, which is most conducive to the subsequent video searching based on face feature information matching.

It is to be noted that since the position of the shooting device is usually fixed and the possibility of the shot object being changed during motion state of the facility is relatively small, it is only necessary to judge a quality of the face detection information in the face detection during the video shooting, and it is unnecessary to perform calculation or comparison with a preset face image, that is to say, it is unnecessary to analyze the detailed appearance features of the face, while in the image captured by the camera, only existence of a face, number of existing faces, proportion of face region, the position of the face, or sharpness (or definition) of the face are detected, therefore such face detection involves a smaller calculation amount and does not occupy excessive calculation resources and has a relatively low power consumption.

Specifically, the methods for determining whether the detected face picture conforms to an update requirement may be set as needed, and several of which are listed below as examples.

The first method is that the proportion of the face image area in the newly detected face picture is higher than the proportion represented by the previously bound feature information.

If the previously bound feature information is a picture, the proportions of the face image areas in the two pictures are directly compared; and if the previously bound feature information is data representing face details, the face size, i.e., corresponding proportion is restored, according to the data, so as to be compared with that of the newly detected picture.

The second method is that the sharpness of the newly detected face picture is higher than the sharpness represented by the feature information.

If the previously bound feature information is a picture, the sharpness of the two pictures is directly compared; and if the previously bound feature information is data representing face details, comparison with the newly detected picture is performed according to the sharpness represented by the data.

The third method is that the shooting angle of the face image in the newly detected face picture is better than the angle represented by the feature information.

If the previously bound feature information is a picture, the shooting angles of faces of the two pictures are directly compared, and the picture with the face angle more facing towards the front may be selected as an updated image; and if the previously bound feature information is data representing face details, the shooting angle of the face may be restored according to the data and then compared with that of the newly detected picture.

The fourth method is that the number of faces in the newly detected face picture is larger than the number of faces represented by the feature information.

Evidently, the above methods for judging whether the face picture meets the update requirement not only can be used alone, but also can be used in combination. For example, the above first and second judgment criteria may be combined: it is set that the newly detected face picture is confirmed as conforming to the update requirement only when the proportion and the sharpness of the face image area in the newly detected face picture are both higher than those represented by the previously bound feature information.

In specific implementation process, the methods for judging whether the face picture meets the update requirement are not limited to the above four methods and can be set as needed.

Similarly, when the face feature information is three-dimensional reconstruction data, it is also feasible to continuously iteratively update face feature information data based on the corresponding data quality index during the video shooting, wherein the specific data quality index may be selected as needed, which will not be repeatedly described herein.

By continuously detecting and updating the feature information corresponding to the video during the video shooting, the shot video can be bound with a face picture or data having a relatively optimal effect, which improves the matching efficiency and matching accuracy of the face searching in the later stage.

Since the shot videos may take up a lot of internal storage space of the camera, in addition, upload of videos may consume a lot of traffic, in some embodiments, it is feasible to recognize the content of the video during the shooting and to decide whether to save and upload the video according to a recognition result of the content of the video, thereby reducing the system costs of shooting, storage and traffic.

For example, in some embodiments, it is also feasible to recognize facial expressions during the shooting. If the recognized expression is a negative expression such as anger, sadness or depression, the shooting in progress is stopped, or the video is directly discarded and is not to be uploaded to the server after completion of the shooting. If the recognized expression is a positive expression such as happiness and excitement, the shooting in progress continues.

In some other embodiments, it is also feasible to recognize a gesture during the shooting and to decide whether to continue the shooting according to the gesture. For example, when the information obtained from detecting the user's gesture is a waving gesture showing that the user is unwilling to the shooting, then the shooting in progress is stopped or the video is directly discarded after completion of the shooting.

The video content can be recognized by any common means in the prior art, such as image recognition by the conventional pattern recognition method or by using deep learning method based on Convolutional Neural Networks (CNN), which will not be repeatedly described herein.

Step S104, uploading the recognized face feature information and the shot video corresponding to the face feature information to a server according to the upload condition after the shooting is completed.

In some embodiment, the uploading condition is uploading all the recognized face feature information and all the shot videos to the server.

In some other embodiments, before uploading the shot video and the corresponding face feature information to the server, the quality of the shot video is also determined, as an uploading condition, i.e., determining whether the video conforms to an upload standard(s), wherein if the video does not conform to the upload standard, the video is deleted, and only videos conforming to the upload standard are to be uploaded so as to reduce pressures on server storage and network transmission.

The specific upload standard may be set in the two aspects below.

In the first aspect, the video is compared with a preset standard face image so as to judge if the video conforms to the upload standard.

The standard face image can be a clear image that is captured by the shooting device before the video shooting or during the video shooting and contains the same face as that in the video, and the standard face image captured is caught and captured by the shooting device, rather than an image taken from the video; the standard face image may also be a clear image received from the cloud by the shooting device or sent by other equipment, which contains the same face as that in the video. The resolution of the standard face image can be higher than or equal to the resolution of the video.

For example, after the shooting is finished, the shooting device may match the standard face image with the face image having the optimal effect which is detected by the shooting device, wherein if the face image having the optimal effect which is detected by the shooting device has an effect (such as sharpness, face angle or face size) worse than that of the standard face image, then the video is considered to be unqualified and directly discarded.

For another example, after the shooting is finished, the shooting device also may match the standard face image with frames of multiple face images randomly extracted from the video, wherein among the frames of the multiple extracted face images, if the proportion of the image frames having a worse effect than that of the standard face image is higher than a preset proportion, then the video is considered to be unqualified and directly discarded.

In the second aspect, it is judged if the video conforms to the upload standard according to a preset standard video parameter.

The standard video parameters can be one or a combination of parameters such as time length of clear recording, the brightness of recording light, the uniformity of recording light, and the video code rate.

For example, after the shooting is completed, the shooting device can detect the time length of the clear segments in the entire video, the average brightness of the recording and other parameters. If these parameters do not meet the standard video parameters, the video is considered to be unqualified and discarded directly.

Evidently, in specific implementation process, the upload standards are not limited to the above two and may be set according to experience and needs, which are not limited herein.

In some embodiments, the face feature information, the corresponding shot video and the bound information may be uploaded simultaneously, and also may be uploaded based on a rule of sequential order. For example, in an embodiment, the face feature information may be first uploaded, then it is decided whether to upload the corresponding shot video and the bound information according to feedback information from the server. Methods for judging upload conditions with a server will be described in detail below.

In the embodiments of the present disclosure, the shooting method 100 further includes step S105, i.e., binding the recognized face feature information with the corresponding video and generating binding relation information. The term "binding" herein and in the present disclosure means establishing and saving a corresponding relation between the face feature information and the corresponding video, and "binding relation information" is information containing the above corresponding relation. In an embodiment, the binding is done by merging the face feature information and the video into one file or by putting the both into one folder, wherein the binding relation information may be the name of the file or folder. In another embodiment, the binding is done by writing the face feature information and an identification code of the corresponding video together into one mapping file (e.g., a text file), wherein the mapping file may be binding relation information. In still another embodiment, the binding is achieved by writing an identification code of the face feature information into the video, or by writing the identification code of the video into the face feature information, wherein the written identification codes may be the binding relation information. In some embodiments, the binding is done by the shooting device before uploading the video and the face feature information to the server. In some other embodiments, a local or remote server may also participate in the binding between the face feature information and the corresponding video. The wording "participate in the binding" herein and in the present disclosure means that the binding between the face feature information and the corresponding video is done by the local or remote server, alone or in combination with other devices (such as the shooting device). A process of the local or remote server participating in the binding between the face feature information and the corresponding video will be described in detail below.

Figure 2:
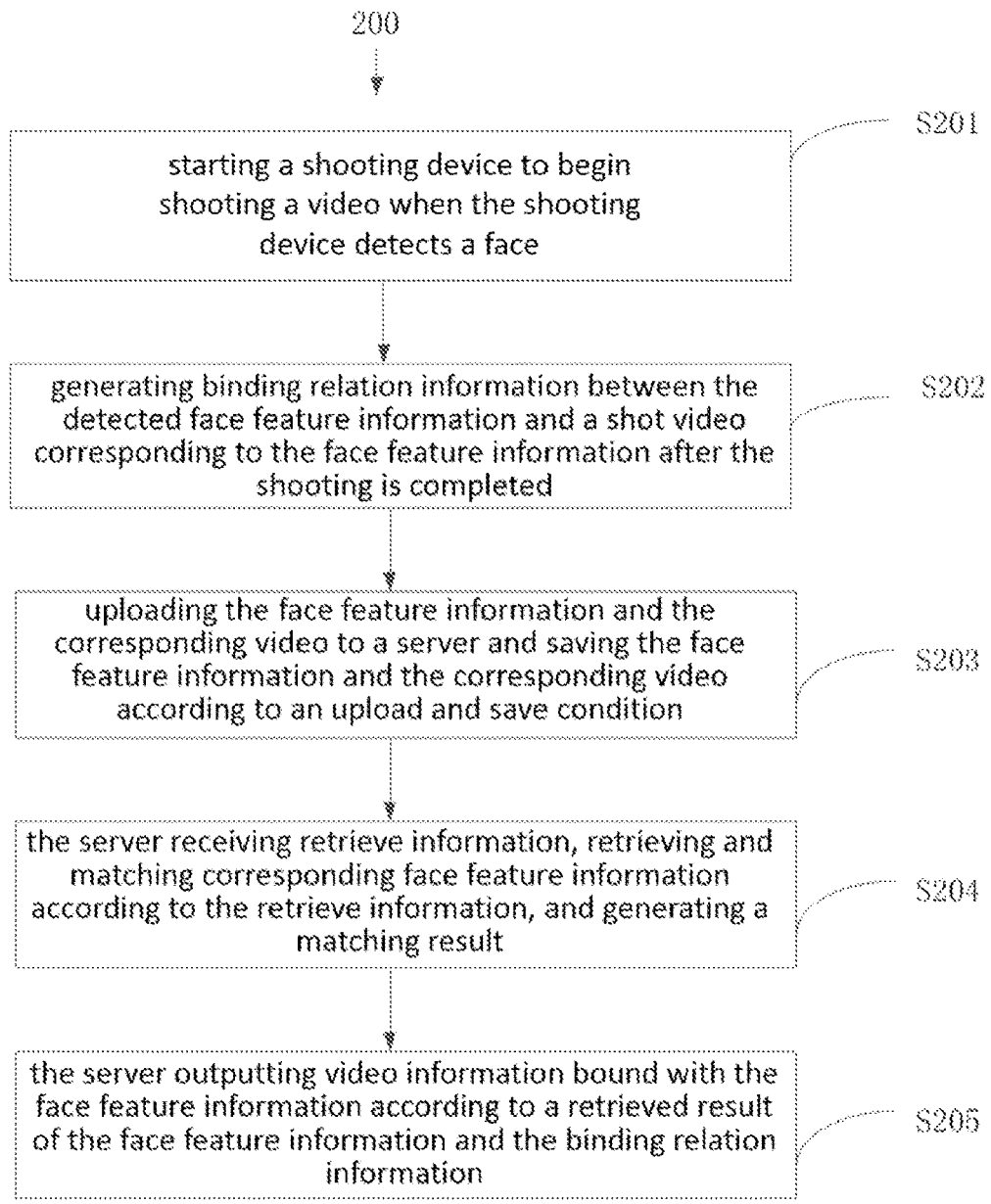
FIG. 2 is a flowchart of a video shooting and playing method at the system side according to embodiments of the present disclosure.

In another embodiment, as shown in FIG. 2, the present disclosure further provides a shooting method 200 for a shooting device, including:

Step S201, starting a shooting device to begin shooting a video when the shooting device detects a face;

Step S202, generating binding relation information between the detected face feature information and a shot video corresponding to the face feature information after the shooting is completed;

Step S203, uploading the face feature information and the corresponding video to a server and saving the face feature information and the corresponding video according to an upload and save condition;

Step S204, the server receiving retrieve information, retrieving and matching corresponding face feature information according to the retrieve information, and generating a matching result; and Step S205, the server outputting video information bound with the face feature information according to a retrieved result of the face feature information and the binding relation information.

Figure 3:
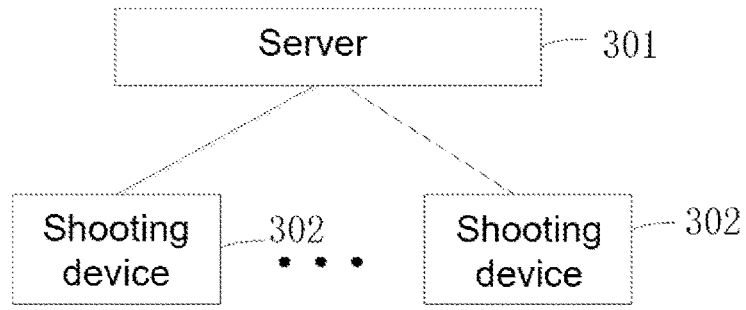
FIG. 3 is a schematic diagram of a system according to embodiments of the present disclosure.

Before introduction of the method provided in the present disclosure, a system to which the method is applicable is to be first introduced, as shown in FIG. 3, the system includes a server 301 and one or more shooting devices 302, wherein the server 301 may be a single server (a main shooting device or an independent server), a group of multiple servers or a cloud, which are not limited herein. The shooting devices 302 and the server 301 may be in a wired or wireless network connection with each other, which is not limited herein.

In the method provided in the present embodiment, the step S201 has already been described in detail above, and will not be repeatedly described herein.

Step S202, generating binding relation information between the detected face feature information and a shot video corresponding to the face feature information after the shooting is completed.

Specifically, a face feature information database may be included in the server, wherein the face feature information database is configured to store face feature information (such as face picture and/or face feature data). A mapping relation between each piece of face feature information and its corresponding face video is determined based on the binding relation information, which facilitates a video searching based on the face image in the later stage. In specific implementation process, according to the specific form of the binding relation information and a main body generating the binding relation information, the face feature information, the shot video and the binding relation information therebetween may be stored in the same server or respectively stored in different servers. For example, when the binding relation information is a separate text file and the text file is generated by the shooting device, the face feature information and the binding relation information (the mapping relation between the original face feature information and the video) are stored in a primary cloud server, and the video correspondingly shot is stored in a secondary cloud server, and vice versa.

In some embodiments, the generation of the binding relation information is realized merely by using the shooting device, and in some other embodiments, the server may also participate in the generation of the binding relation information. The specific forms of the binding relation information have already been described above and will not be repeatedly described herein.

Further, in some embodiments in which the server participates in the generation of the binding relation information, after the shooting device uploads the face feature information to the server, the server uses the newly received face feature information as the first face feature information, and then performs retrieve (or searching) and matching with the existing face feature information in the face feature information database, wherein if no original face feature information matching the recognition feature information is detected, the recognition feature information of the face may be stored in a face database as an additional item in the database, and the video and the bound recognition feature information of the face may be mapped and stored accordingly and the binding relation information may be generated. Evidently, it is also feasible to select to discard the video, which is not limited herein.

If it is retrieved that the newly received face feature information matches an existing face feature information in the face feature information database (that is, the coincidence points to the same face feature), the server uses the retrieved and matched face feature information as the second face feature information, and updates the face feature information and binding relation information according to the first face feature information and the second face feature information. Specifically, it is feasible to select to retain the newly received first face feature information in the face feature information database, and to delete the second face feature information and update the binding relation information. The video previously bound with the second face feature information may be updated to be bound with the first face feature information. Conversely, similar steps may be used to retain the second face feature information, delete the first face feature information and update the binding relation information as well. Further, in order to improve the quality of the original face feature information stored in the face database of the server, so as to improve the accuracy of the video searching in the later stage, it is also feasible to set that after the server finds the second face feature information in the pre-stored face database, it compares the first face feature information with the second face feature information, and selects to retain the face feature information having a better quality according to the comparison result. The specific form of the comparison may be comparing the image sharpness represented by the face feature information with that represented by the original feature information, or comparing the face size represented by the face feature information with that represented by original feature information, or comparing the face angle represented by the face feature information with that represented by original feature information, etc., which may be set as needed and is not limited herein.

Step S203, uploading the face feature information and the corresponding video to a server and saving the same according to an upload and save condition.

The upload and save condition may be uploading and saving all face feature information and corresponding videos, or it also may be selectively uploading and saving face feature information and corresponding videos according to a preset rule.

In specific implementation process, in order to reduce pressure on server storage and the calculation amount in the subsequent searching, a video storage limit may be first set as the upload and save condition. In some embodiments, before saving and uploading the video, the server first judges whether to trigger the video storage limit and decides a storage mode of the uploaded video according to the judgment result. For example, in an embodiment, the server first finds the matched face in the pre-stored face database, and acquires the historical video data which is corresponding to the face feature information and currently stored on the server. Based on the historical video data, it is determined whether to trigger the video storage limit. If the video storage limit is triggered, the uploaded video is deleted, and if the video storage limit is not triggered, the uploaded video is saved accordingly.

Further, the shooting device can first send the face feature information to the server to judge whether to trigger the video storage limit or not, wherein if it does not meet the requirement, the server will directly notify the shooting device to discard the video bound with the face feature information, which saves both storage space and network resources. The shooting device may also send the video and the bound face feature information together to the server to judge whether the video conforms to the video storage limit, wherein if it does not conform to the requirement, the server may directly discard the video so as to save storage space.

In some embodiments, the video storage limit may be a limit on the amount of historical video data, a limit on the total size of historical video data, or a limit on how long historical video data has been stored on the server. For example, when the server detects that as for the face feature information bound with a video to be uploaded, a certain number of corresponding videos are already stored in the server, the server may notify the shooting devices to directly discard the video to be uploaded corresponding to the face, or although the video to be uploaded is uploaded to the server, the server may set a short storage time and then delete the video.

Evidently, in specific implementation process, it is not limited to the above video storage scheme. It is also feasible to set that if the historical video data triggers the video storage limit, the storage time length of uploaded video is limited to a first time length, and if the historical video data does not trigger the video storage limit, then the video is saved accordingly or the storage time length of the video is set to be a second time length, wherein the second time length is larger than the first time length. In some other embodiments, if a sum of the total video length of the historical video data and the currently uploaded video length is greater than a preset value, the currently uploaded video may be analyzed and clipped, or the historical videos may be analyzed and clipped so that the sum of the saved video length is no greater than the preset value. For example, when the sum of the video length is detected to be greater than the preset value, the server detects and evaluates the contents of the uploaded video and the saved historical video data, and deletes the video frames or video clips that do not meet a preset standard, such that the total video length after saving is less than or equal to the preset value. In an embodiment, detection and evaluation on the contents of the video are on the basis of a ratio of frames including the target face in the video to the total number of frames in the video, when the ratio of frames including the target face in the video clip to the total number of frames in the video is less than a video quality threshold (for example, 50%), it is determined that the video clip fails to meet the preset standard, and then it is subjected to a deletion processing, otherwise, the video clip is retained. In another embodiment, deep learning method based on neural network can be used to classify and determine the excellence level of contents of video clips, so as to determine the deletion or retention of video clips. Common methods in the prior art may be used for classifying and evaluating video contents with deep learning method based on neural network, which will not be repeatedly described herein.

Step S204: the server receiving retrieve information, retrieving and matching corresponding face feature information according to the retrieve information, and generating a matching result.

In the present embodiment, the server can receive retrieve information from a user side or a third-party platform so as to perform video searching. The retrieve information may include retrieve information on face feature (e.g., face image or face description data) and/or information defining a retrieve scope (e.g., gender, age group or height, etc.). The retrieve information on face feature may be an image including the face to be searched, with the image being shot by the user using any image acquisition equipment (such as mobile phone terminal, tablet computer terminal, camera, etc.), it may also be an image already saved by the user (such as an image locally saved or saved on a cloud storage platform by the user), with the image containing the face to be searched. The retrieve information on face feature may also be a depth map containing face information or an image having depth information. The manner that the user sends the retrieve information to the server may be the user scanning a QR code to enter a command panel and then sending the retrieve information to the server, it may also be the user logging in an application to send the retrieve information. In order to improve security, it is also feasible to set that before the server outputs a target video to the user or before the server receives the retrieve information, user authentication is performed first so as to ensure that the user is not an illegal disruptor user. However, in the present embodiment, the contents of the retrieve information which serve as the basis of the searching and the acquisition and sending modes thereof are not limited to those listed above.

After receiving the retrieve information, the server finds a target face matching the retrieve information in its own face feature information database using an existing face matching algorithm. Further, in some embodiments, after receiving the retrieve information, the server first judges whether the retrieve information meets a preset requirement. For example, the server may perform quality judgment on whether the retrieve information contains face information that can be retrieved, and the judgment criteria for the retrieve information may include but not limited to the size, sharpness, relative position (such as the front or side face) of the face information, existence of hair styles and blocking by accessories, etc. The specific judgment process may be achieved by selecting common image algorithms regarding specific standards, such as pattern recognition algorithms or image definition detection algorithms, which will not be repeatedly described herein. When the retrieve information does not meet the preset requirement, the server sends information to the user side to prompt that the retrieve information is not qualified.

Since there may be multiple pieces of face feature information having close matching degrees or high matching degrees in the retrieve information, in some embodiments, when retrieving and matching the corresponding face feature information, the server further determines the matching results to be output (i.e. the matched face feature information) according to the retrieve results and a matching rule. For example, after the retrieve, the retrieve results may be matching degree index information having numerical values, the matching rule may be analyzing the retrieve results, selecting a retrieve result whose matching degree index is greater than a matching threshold as the matching result, a retrieve result having a highest matching degree index also may be selected as the matching result, or, all retrieve results having a difference of matching degree index being within a preset difference as compared with the retrieve result having the highest matching degree are selected as the matching results. The matching degree index may be obtained by using any existing technology in the prior art for generating matching score values of a face image, which will not be repeatedly described herein. In some other embodiments, the matching rule itself may be determined based on features of the retrieve results. For example, the server may judge the quality of the face feature information returned from the retrieve results and give a quality index. The methods for judging the quality of face feature information can refer to the above described methods for judging quality of retrieve information. When the quality index of the face feature information is relatively low (lower than a preset value, for example), the matching rule may be set as, selecting all retrieve results having a difference of matching degree index being within a preset difference as compared with the retrieve result having the highest matching degree, as the matching results. When the quality index of the face feature information is relatively high, the matching rule may be set as, selecting a retrieve result whose matching degree index is greater than a matching threshold, as the matching result.

Those of ordinary skills in the art could understand that the above rules are merely illustrative rather than restrictive, and the specific matching rules may be selected according to actual circumstances, which will not be limited in the present disclosure. Determining the output matching results according to the matching rules can improve the accuracy and quantitative rationality of the matching results which are finally output, optimize the user experience, and avoid the server to output more low-quality and meaningless results that reduces the system performance Step S205, the server outputting, according to the matching result and the binding relation information, video information bound with the face feature information contained in the matching result.

Specifically, after obtaining the matching result, the server finds the target video corresponding to the matching result according to the face feature information contained in the matching result and the binding relation information between the face feature information and the video stored in the server, uses the target video as the video information bound with the face feature information contained in the matching result, and pushes the same to the user to play.

Optionally, if multiple videos are stored corresponding to the target face feature information contained in the matching result, that is, when there is a binding relation between multiple videos and the target face, the description information for the multiple videos is output to the user, such that the user can select the target video to be played according to the description information. Further, after receiving the user's selection instruction for selecting the target video among the multiple videos, the server may output the target video to play according to the selection instruction. In the above, the description information may include any one or a combination of the following: shooting time, time length of video playing, thumbnail and video quality score, etc. The description information may be output in the form of list output or pagination output, etc., which is not limited herein.

It is to be noted that in steps S204 and S205, when the server is a server group, steps such as receiving the retrieve information, matching and searching for the target face feature information, outputting the target video, saving the video and the face database may be distributed on different servers or clouds to be executed. Evidently, the steps may also be executed on the same server or cloud, which can be set as needed, which is not limited herein.

Figure 4:
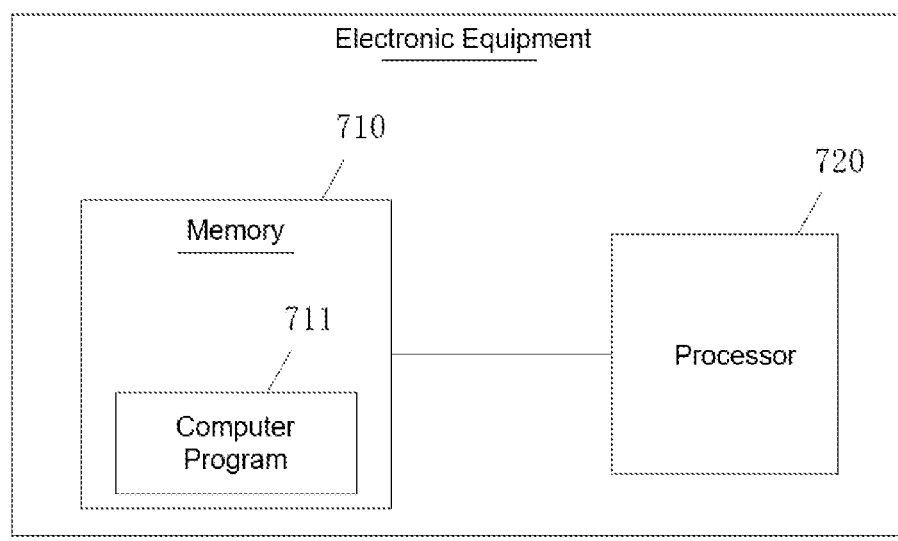
FIG. 4 is a schematic structural diagram of an electronic equipment according to an embodiment of the present disclosure.

Another embodiment further provides an electronic equipment, as shown in FIG. 4, including a memory 710, a processor 720 and a computer program 711 which is stored in the memory 710 and runnable on the processor 720, and when executing the computer program 711, the processor 720 realizes the following steps of:

a shooting device in a standby state detecting motion data and judging if the shooting device meets a starting condition according to the motion data; starting the shooting device to begin to detect faces if the shooting device meets the starting condition;

determining, at least based on a situation of face detected by the shooting device, whether to start the shooting device to begin shooting a video, and recording face feature information corresponding to the video; and uploading, according to an uploading condition, the face feature information and the shot video corresponding to the face feature information to a server after the shooting is completed.

In the shooting method for shooting device and the electronic equipment in the embodiments of the present disclosure, it is set that the face detection function is activated only after detecting that the starting condition is met, which avoids the high power consumption resulted from the continuous running of the face detection function. It is also set that the shooting device is started to shoot a video after a face is detected, which reduces the high power consumption resulted from the continuous video shooting, and also avoids the traffic consumption and storage consumption caused by a large number of invalid videos being sent to the server, thereby effectively achieving the technical effects of reducing power consumption, traffic consumption and storage space consumption.

Those skilled in the art should understand that the embodiments of the present disclosure may be provided as methods, systems or computer program products. Therefore, the present disclosure may be implemented in form of full hardware embodiments, full software embodiments, or software and hardware combined embodiments. In addition, the present disclosure may be in form of one or more computer program products which are implemented in computer available storage media (which include but are not limited to disk memory, CD-ROM, optical memory, etc.) containing computer available program codes.

These computer program instructions may also be loaded into computers or other programmable data processing devices, such that a sequence of operation steps are performed on computers or other programmable devices to produce a computer-implemented process, in this way, instructions executed on computers or other programmable devices provide steps for implementing the functions specified in one or more processes of a flowchart and/or in one or more boxes of a block diagram.

It is apparent that those skilled in the art could make various modifications or variations on the present disclosure without departing from the spirit and scope of the present disclosure. In this way, if these modifications and variations of the present disclosure fall within the scope of the claims of the present disclosure or equivalent technologies thereof, these modifications and variations are also intended to be covered by the present disclosure.

INDUSTRIAL APPLICABILITY

In the shooting method for shooting device and the electronic equipment in the embodiments of the present disclosure, it is set that the face detection function is activated only after detecting that the starting condition is met, which avoids the high power consumption resulted from the continuous running of the face detection function. It is also set that the shooting device is started to shoot a video after a face is detected, which reduces the high power consumption resulted from the continuous video shooting, and also avoids the traffic consumption and storage consumption caused by a large number of invalid videos being sent to the server, thereby effectively achieving the technical effects of reducing power consumption, traffic consumption and storage space consumption.

What is claimed is:

1. A shooting method for a shooting device, comprising followings steps:

starting the shooting device to begin shooting a video when the shooting device detects a face, and recording face feature information corresponding to the video;

uploading the face feature information and the corresponding video to a server and saving the face feature information and the corresponding video according to an upload and save condition after the shooting is completed, wherein binding relation information between the face feature information and the corresponding video is generated;

the server receiving retrieve information, retrieving and matching corresponding face feature information according to the retrieve information, and generating a matching result; and the server outputting, according to the matching result and the binding relation information, information of a video bound with a matched face feature information.

2. The method according to claim 1, wherein the step of uploading the face feature information and the corresponding video to a server and saving the face feature information and the corresponding video according to an upload and save condition comprises followings steps:

the server using newly received face feature information as first face feature information, and retrieving a matched face feature information from existing face feature information in a face feature information database;

saving the first face feature information into the face feature information database if no face feature information matching the first face feature information is detected in the face feature information database, and saving the video accordingly; and comparing the first face feature information and second face feature information if the second face feature information matching the first face feature information is detected in the face feature information database, selecting to retain face feature information having a better quality according to a comparison result and saving the video accordingly.

3. The method according to claim 1, wherein the step of uploading the face feature information and the corresponding video to a server and saving the face feature information and the corresponding video according to an upload and save condition comprises followings steps:

the server using newly received face feature information as first face feature information, and searching existing face feature information in a face feature information database for a matched face feature information;

judging whether a video storage limit is triggered according to historical video data corresponding to second face feature information after the second face feature information matching the first face feature information is detected in the face feature information database; and determining a method for processing an uploaded video according to a judgment result.

4. The method according to claim 1, wherein the step of retrieving and matching corresponding face feature information according to the retrieve information, and generating a matching result further comprises followings steps:

retrieving and matching the corresponding face feature information, according to the retrieve information, to generate a retrieve result of face feature information having matching degree index information of numerical values; and determining the matching result according to the matching degree index information.

5. The method according to claim 1, wherein the step of the server outputting, according to the matching result and the binding relation information, information of a video bound with a matched face feature information comprises following steps:

outputting, if multiple videos are stored corresponding to face feature information contained in the matching result, description information for the multiple videos;

receiving a selection instruction from a user for selecting a target video among the multiple videos based on the description information; and outputting the target video to play according to the selection instruction.

6. The method according to claim 1, wherein the step of uploading the face feature information and the corresponding video to a server and saving the face feature information and the corresponding video according to an upload and save condition after the shooting is completed comprises a step:

judging whether the video conforms to an upload standard after the shooting device completes the shooting, wherein the face feature information and the shot video corresponding to the face feature information are uploaded to the server if the video conforms to the upload standard.

7. The method according to claim 1, wherein the method further comprises:

starting the shooting device to begin shooting a video when the shooting device detects a face, and recording face feature information corresponding to the video;

detecting the face continuously during shooting the video; and updating and recording, if new face feature information conforming to an update requirement is detected, the face feature information corresponding to the video according to the new face feature information.

8. The method according to claim 3, wherein the step of determining a method for processing an uploaded video according to a judgment result comprises:

deleting the uploaded video if the video storage limit is triggered, and saving the uploaded video accordingly if the video storage limit is not triggered; or limiting a storage time length of the uploaded video to a first time length if the video storage limit is triggered, and setting the storage time length of the uploaded video to be a second time length if the video storage limit is not triggered, wherein the second time length is greater than the first time length; or analyzing and clipping currently uploaded video or the historical video data if the video storage limit is triggered, such that a total length of saved videos is not greater than a third time length, and saving the uploaded video accordingly if the video storage limit is not triggered.

9. The method according to claim 4, wherein the step of determining the matching result according to the matching degree index information comprises:

determining a quality index representing a quality of face feature information in the retrieve result; and determining a matching rule according to the quality index and determining the matching result according to the determined matching rule and the matching degree index information.

10. The method according to claim 6, wherein the step of judging whether the video conforms to an upload standard comprises:

the shooting device comparing the video with a preset standard face image, judging whether the video conforms to the upload standard; and/or judging whether the video conforms to the upload standard according to a preset standard video parameter.

11. The method according to claim 6, wherein the step of judging whether the video conforms to an upload standard comprises:

the shooting device sending the face feature information to the server; and receiving feedback information sent by the server based on the face feature information, and judging whether the video conforms to the upload standard according to the feedback information.

12. The method according to claim 7, wherein the shooting device detecting a face comprises any one or a combination of following conditions:

the shooting device detecting that a proportion of a face image area in an image area shot by a camera reaches a preset proportion; or the shooting device detecting that the number of faces in the image area shot by the camera reaches a preset number; or the shooting device detecting that a pixel size of the face image area reaches a preset pixel size; or the shooting device detecting that a position of the face image area in the image area shot by the camera meets a preset position requirement.

13. The method according to claim 7, wherein the new face feature information conforming to the update requirement comprises any one or a combination of following conditions:

a proportion of a face image area in the new face feature information is higher than a proportion represented by original face feature information; or sharpness of the new face feature information is higher than sharpness represented by the original face feature information; or a shooting angle of a face image in the new face feature information is better than an angle represented by the original face feature information; or the number of faces in the new face feature information is larger than the number of faces represented by the original face feature information.

\* \* \* \* \*